United States Patent
Ojiro et al.

(10) Patent No.: US 8,709,333 B2
(45) Date of Patent: Apr. 29, 2014

(54) METHOD OF MANUFACTURING PIPE WITH BRANCH

(75) Inventors: Minoru Ojiro, Gunma (JP); Tomoyoshi Sakamoto, Ota (JP); Hiroki Katagiri, Yokohama (JP)

(73) Assignee: RP Topla Limited, Osaka (JP)

( * ) Notice: Subject to any disclaimer, the term of this patent is extended or adjusted under 35 U.S.C. 154(b) by 233 days.

(21) Appl. No.: 13/147,156

(22) PCT Filed: Jan. 21, 2010

(86) PCT No.: PCT/JP2010/000332
§ 371 (c)(1),
(2), (4) Date: Jul. 29, 2011

(87) PCT Pub. No.: WO2010/087134
PCT Pub. Date: Aug. 5, 2010

(65) Prior Publication Data
US 2011/0285057 A1  Nov. 24, 2011

(30) Foreign Application Priority Data

Jan. 30, 2009 (JP) .................................. 2009-18999
Jul. 28, 2009 (JP) ................................. 2009-174895

(51) Int. Cl.
*B29C 45/00* (2006.01)
*B29C 49/00* (2006.01)

(52) U.S. Cl.
USPC .......................................... 264/544; 264/573

(58) Field of Classification Search
None
See application file for complete search history.

(56) References Cited

U.S. PATENT DOCUMENTS 5,948,343 A * 9/1999 Hiroki et al. .................. 264/503

FOREIGN PATENT DOCUMENTS

| JP | 04-208425 A | 7/1992 |
|---|---|---|
| JP | 08-230066 A | 9/1996 |
| JP | 8-230066 A | 9/1996 |
| JP | 9-85768 A | 3/1997 |
| JP | 11-114997 A | 4/1999 |
| JP | 3462290 B2 | 8/2003 |

OTHER PUBLICATIONS

International Search Report for PCT/JP2010/000332, mailed on Feb. 16, 2010.
Brunswick A: "Gewusst Wie! Fragen Und Antworten Zur Wasserinjektonstechnik", Kunstoffe International, Carl Hanser Verlag, Munchen, DE, vol. 92, No. 9, Sep. 1, 2002, XP001119349, pp. 94-98.
Brunswick, A.: "Herstellung medienführender Leitungen", In: Eyerer, P., Elsner, P., Knoblauch-Xander, M., von Riewel, A.: Apr. 1, 2003, Carl Hanser Verlag, München, XP009015088, pp. 185-199.
Extended European Search Report, dated Apr. 27, 2012, issued in EP Patent Application No. 10735606.5.

* cited by examiner

*Primary Examiner* — Monica Huson
(74) *Attorney, Agent, or Firm* — Birch, Stewart, Kolasch & Birch, LLP

(57) ABSTRACT

The present invention includes injecting a molten resin into a main cavity, which has on its one end a pressure port provided with a floating core and on its other end a first outlet, and a branch cavity, which communicates with the main cavity and has on its end a second outlet allowed to open and close, injecting a pressurized fluid through the pressure port after the injection of the molten resin, and moving the floating core to the first outlet side, and, at the same time, extruding the molten resin from the first outlet to form a main pipe hollow, and opening the second outlet after the main pipe hollow reaches a portion at which the branch cavity communicates with the main cavity, and extruding the molten resin by the pressurized fluid from the second outlet to form the branch pipe hollow.

8 Claims, 4 Drawing Sheets

METHOD OF MANUFACTURING PIPE WITH BRANCH

TECHNICAL FIELD

The present invention relates to a pipe integrally formed by injection molding with a synthetic resin, and in particular to a method of manufacturing a pipe with a hollow branch.

BACKGROUND ART

In the prior art, as a method and device that can integrally mold a pipe with a synthetic resin, there has been known the method and device that uses a mold in which a cavity has on its one end a floating core, having a diameter corresponding to the inner diameter of the pipe, and a pressure port through which a pressurized fluid is pressure-injected, and the cavity has on its other end an outlet. After the inside of the cavity is filled with a molten resin, the pressurized fluid is pressure-injected through the pressure port to move the floating core to the outlet side, and, thus, to form a hollow in the resin in a main cavity. At the same time, an excess resin is extruded from the outlet, whereby a hollow pipe is integrally molded (Patent Documents 1 and 2).

However, in the method and device described in the Patent Documents 1 and 2, the hollow of the pipe is formed as sort of a moving track of the floating core. Since the floating core moves in only one direction, there is a problem that a pipe with a branch cannot be produced. It is considered to provide a plurality of floating cores and move the floating cores in different directions so that the pipe with a branch can be integrally molded; however, because of the structure of the mold, it is extremely difficult to enable the plurality of floating cores to move in the different directions.

Patent Document 3 discloses a method of manufacturing a pipe with a branch by molding using a floating core.

PRIOR ART DOCUMENTS

Patent Documents

Patent Document 1: Japanese Patent No. 1988870
Patent Document 2: Japanese Patent No. 3462290
Patent Document 3: Japanese Patent No. 3771295

DISCLOSURE OF THE INVENTION

Problems to be Solved by the Invention

In the method according to the Patent Document 3, a sliding core is used for molding of a branch, and this raises various problems. For example, only a branch of a straight pipe can be molded. Moreover, a main pipe and a branch are connected through a thin resin film immediately after molding, and machining is required to be carried out to remove the thin resin film completely. Accordingly, the method limits the usefulness thereof.

In view of the above problems, an object of the present invention is to provide a method of manufacturing a pipe with a branch, which utilizes the conventional pipe molding method using a floating core, and while taking advantage of the pipe molding method, various types of pipes with a branch can be integrally molded with a synthetic resin with high efficiency.

Means for Solving the Problems

Namely, a method of manufacturing a pipe with a branch according to the present invention is characterized by including injecting a molten resin into a main cavity, which has on its one end a pressure port provided with a floating core and on its other end a first outlet, and a branch cavity, which communicates with the main cavity and has on its end a second outlet allowed to open and close, pressure-injecting a pressurized fluid through the pressure port after the injection of the molten resin, and moving the floating core to the first outlet side, and, at the same time, extruding the molten resin from the first outlet to form a main pipe hollow, and extruding the molten resin by the pressurized fluid from the second outlet to form a branch pipe hollow.

Effect of the Invention

According to the present invention, even when a main pipe and a branch pipe are curved, a pipe with a branch can be integrally molded. Since the pipe is formed by injection molding, the pipe with high dimensional accuracy and good appearance can be manufactured advantageously in cost.

MODE FOR CARRYING OUT THE INVENTION

Figure 1:
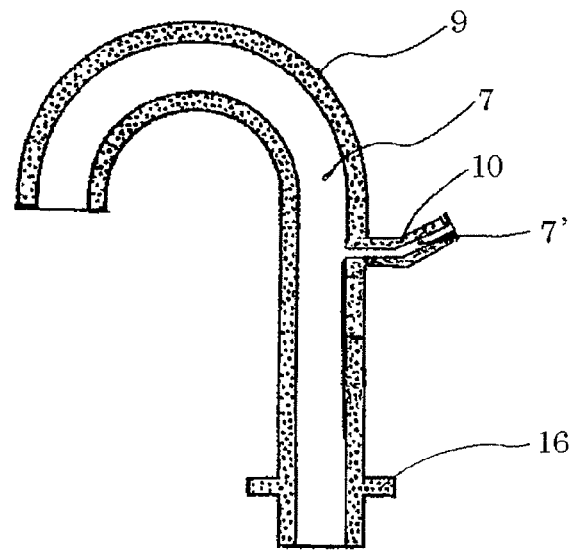
FIG. 1 A cross-sectional view showing an example of a pipe with a branch manufactured according to the present invention.

FIG. 1 is a cross-sectional view showing an example of a pipe with a branch manufactured according to the present invention. The pipe with a branch manufactured according to the present invention is constituted of a main pipe 9, a branch pipe 10, and a flange 16, which is provided according to need. The main pipe 9 and the branch pipe 10 include a main pipe hollow 7 and a branch pipe hollow 7', respectively.

Figure 2:
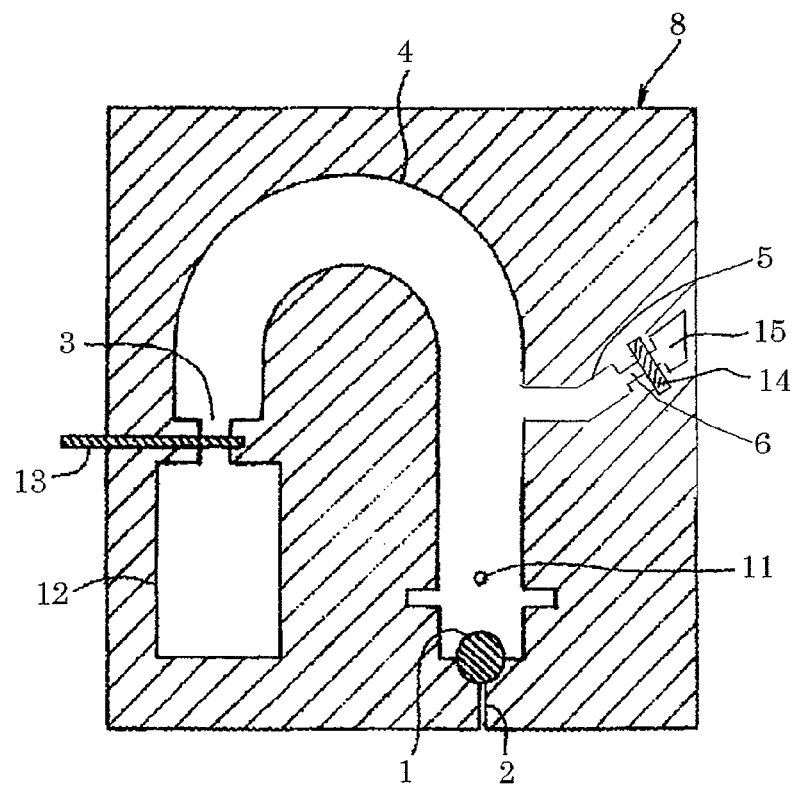
FIG. 2 A cross-sectional view of a mold for use in the manufacturing of the pipe with a branch of FIG. 1.

FIG. 2 is a cross-sectional view of a mold for use in the manufacturing of the pipe with a branch of FIG. 1. In FIG. 2, a main cavity 4 is used for molding the main pipe 9 shown in FIG. 1. In FIG. 2, although a gate 11 as an opening is formed in the cavity 4, the gate 11 may be provided at any position of a branch cavity 5, which will be described later, and so on. Although the main pipe 9 and the branch pipe 10 of FIG. 2 are curved, they may be straight.

The main cavity 4 has on its one end a floating core 1, which has a diameter corresponding to the inner diameter of the main pipe 9, and a pressure port 2 through which a pressurized fluid pressing and moving the floating core 1 to the other end side of the main cavity 4 is pressure-injected.

The floating core 1 is provided in the main cavity 4 so that its back faces the pressure port 2, whereby the floating core 1 can be pressed by the pressurized fluid pressure-injected through the pressure port 2. The floating core 1 can be formed of a metal, such as copper, brass, stainless steel, iron, and aluminum or can be formed of a synthetic resin as long as the floating core is not significantly deformed by melting during molding. Especially when the floating core 1 is formed of a synthetic resin, the floating core 1 can be easily pressed and moved even if the pressure of the pressurized fluid is not so high because the floating core 1 formed of a synthetic resin is small in weight. Moreover, the injected resin which is contact with the floating core 1 is less likely to be rapidly cooled in comparison with the case where the floating core 1 is formed of a metal, and therefore, there is an advantage that the inner surface condition on the pressure port 2 side of the main pipe 9 is improved. The shape of the floating core 1 is not limited to a spherical shape shown in FIG. 2, and the floating core 1 may have a conical shape, a bullet shape, or a hemispherical shape as long as the maximum diameter corresponds to the inner diameter of the main pipe 9.

The pressure port 2 is connected to a pressurized fluid system (not shown) for pressure-injecting/discharging a pressurized fluid.

The main cavity 4 has a first outlet 3 provided at the other end, and the first outlet 3 is connected to a first excess resin storage cavity 12. The first outlet 3 can be opened and closed by first opening and closing means 13.

The branch cavity 5 is provided at arbitrary position of the main cavity 4 so as to communicate with the main cavity 4. The branch cavity 5 is used for molding the branch pipe 10. The branch cavity 5 has on its end a second outlet 6, and the second outlet 6 is connected to a second excess resin storage cavity 15. The second outlet 6 can be opened and closed by second opening and closing means 14.

In FIG. 2, although the branch cavity 5 is provided vertically to the main cavity 4, the branch cavity 5 may be inclined to the main cavity 4, and the branch cavity 5 can be provided at any angle.

As described later, the main pipe hollow 7 is formed by movement of the floating core 1, and the branch pipe hollow 7' is formed by the pressurized fluid pressure-injected through the pressure port 2.

Next, a method of manufacturing the pipe with a branch according to the present invention will be described based on FIGS. 3 to 7.

Figure 3:
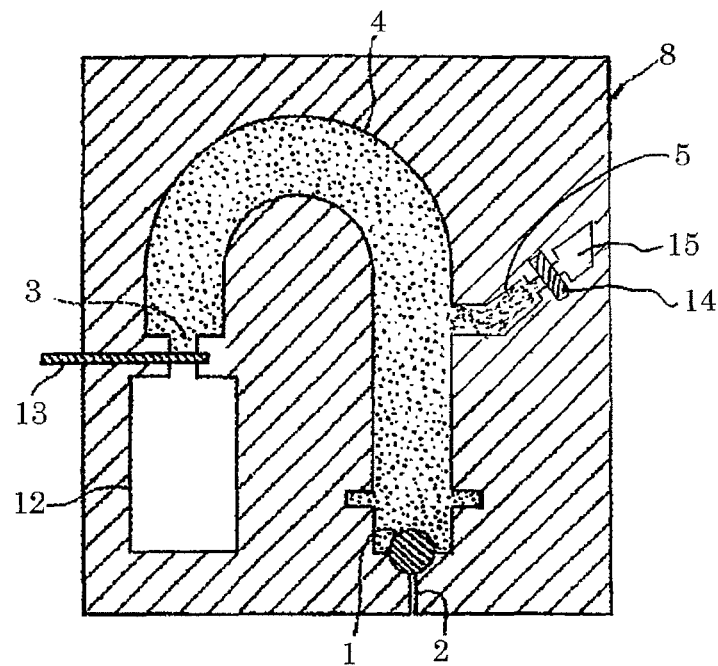
FIG. 3 An explanatory view of a method of manufacturing the pipe with a branch according to the present invention.

First, as shown in FIG. 3, the molten resin is injected from the gate 11 while the first outlet 3 and the second outlet 6 are closed, and the main cavity 4 or the branch cavity 5 are filled with the molten resin. In the injection of the molten resin, the molten resin in an amount that substantially fills the insides of the main cavity 4 and the branch cavity 5 may be injected. In this case, even if an unfilled portion remains in the main cavity 4 or the branch cavity 5, the unfilled portion can be filled in the pressure injection of the pressurized fluid to be described later. If a pressure keeping state can be maintained when the second outlet is opened, molding can be performed using the mold 8 without having the first opening and closing means 13.

As the resin used in the present invention, a thermoplastic resin used in general injection molding and extrusion molding can be widely used, or a thermosetting resin can be used according to need. According to need, those resins may contain reinforcing fiber, such as glass fiber, carbon fiber, and metal fiber, various fillers, additives, and colorants.

In the injection of the molten resin, the molten resin is injected by an injection machine as in usual injection molding. The injection pressure is similar to that in the usual injection molding, and although the injection pressure is different depending on, for example, the kind of resin to be used, the presence of addition of reinforcing fiber, and the additive amount of the reinforcing fiber, it is usually approximately 4.90 to 19.61 MPa (50 to 200 kg/cm$^2$).

The molten resin is injected while maintaining a state that the floating core 1 is located on the pressure port 2 side. This can be realized by providing the gate 11 (see, FIG. 2) on the first outlet 3 side relative to the floating core 1, for example.

Figure 4:
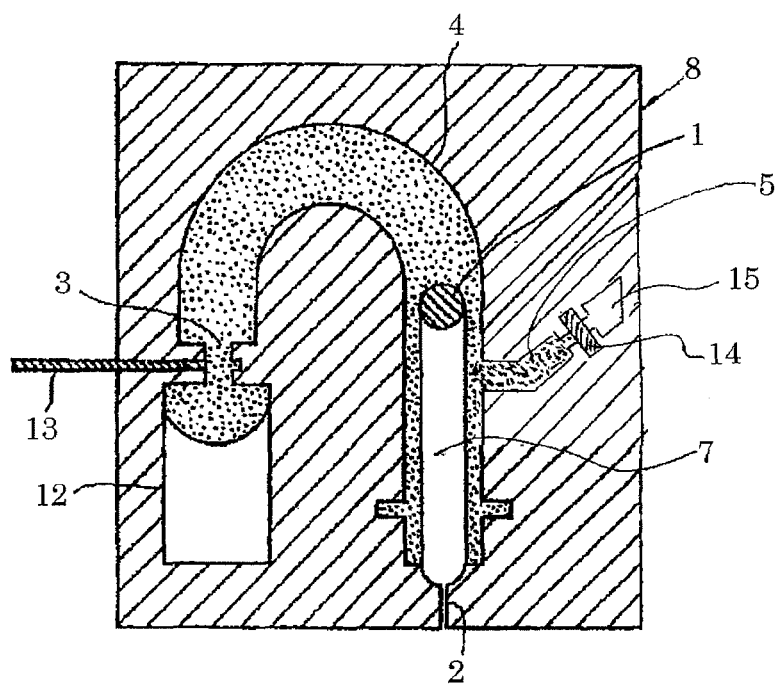
FIG. 4 An explanatory view of the manufacturing method according to the present invention.

Then, as shown in FIG. 4, the first outlet 3 is opened, and, at the same time, or after a predetermined time has elapsed, the pressurized fluid is pressure-injected through the pressure port 2.

As the pressurized fluid, there is used a gas or liquid that does not react with or is not compatible with the resin to be used under injection-molding temperature and pressure conditions. Specifically, nitrogen gas, carbon dioxide gas, air, glycerin, liquid paraffin, and so on can be used; however, an inert gas containing nitrogen gas is preferably used.

In the pressure-injection of the pressurized fluid, for example when a gas such as nitrogen gas is used as the pressurized fluid, a pressurized gas such as a nitrogen gas, whose pressure is raised by a compressor, is previously stored in an accumulator, and the pressurized gas is introduced into the pressure port 2 through a pipe, whereby the pressurized gas can be pressure-injected. Alternatively, the pressurized gas whose pressure is raised by a compressor is directly supplied to the pressure port 2, and the pressure of the pressurized gas is sequentially increased, whereby the pressurized gas can be pressure-injected. In the former, although the pressure of the pressurized gas supplied to the pressure port 2 is different depending on the kind of the resin to be used, it is usually approximately 4.90 to 29.42 MPa (50 to 300 kg/cm$^2$G).

When the pressurized fluid is pressure-injected, the floating core 1 advances toward the first outlet 3 so as to extrude a slowly cooled molten resin at the center portion of the main cavity 4 into the first excess resin storage cavity 12 through the first outlet 3, while remaining resin close to the outer periphery of the main cavity 4, which starts to be solidified by cooling. After the floating core 1 has passed through the main cavity 4, a main pipe hollow 7 having a diameter substantially the same as the diameter of the floating core 1 is formed. Thus, the inner diameter of the main pipe 9 can be adjusted by selecting the diameter of the floating core 1.

The resin of a portion at which the main pipe hollow 7 is formed is pressed against the peripheral wall surface of the main cavity 4 by the pressure of the pressure-injected pressurized fluid, and the shape of the main pipe hollow 7 is maintained.

Figure 5:
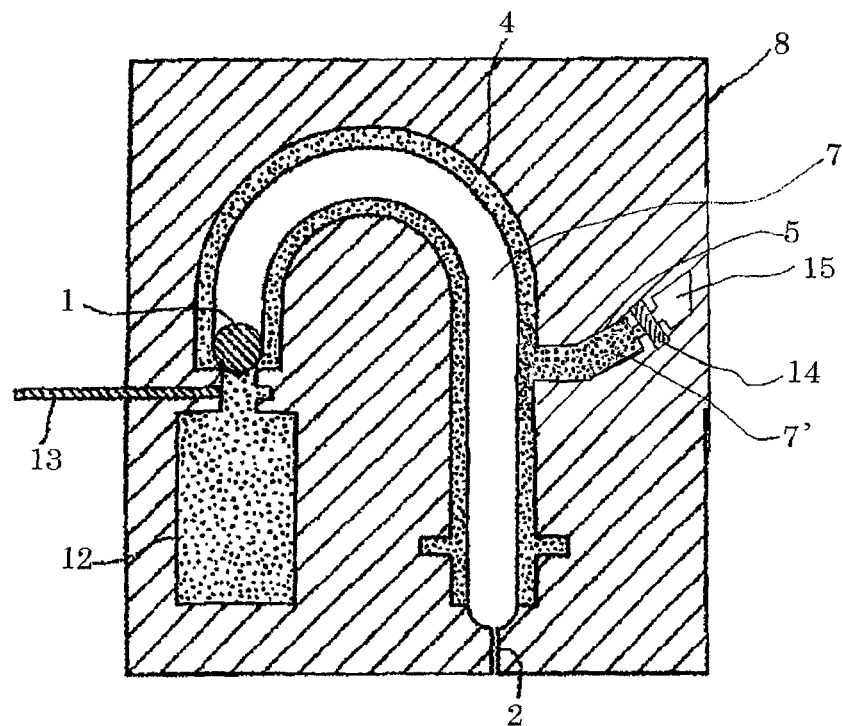
FIG. 5 An explanatory view of the manufacturing method according to the present invention.

When the pressurized fluid is further pressure-injected, as shown in FIG. 5, the floating core 1 reaches the position of the first outlet 3 to be in press contact with the first outlet 3, and, thus, to close the first outlet 3.

In FIG. 5, the floating core 1 is in press contact with the first outlet 3; however, the floating core 1 is not always in press contact with the first outlet 3. For example, when the floating core 1 is inserted into the first excess resin storage cavity 12, the floating core 1 is not in press contact with the first outlet 3. In this case, the diameter of the first outlet 3 is required to be larger than the diameter of the floating core 1.

Figure 6:
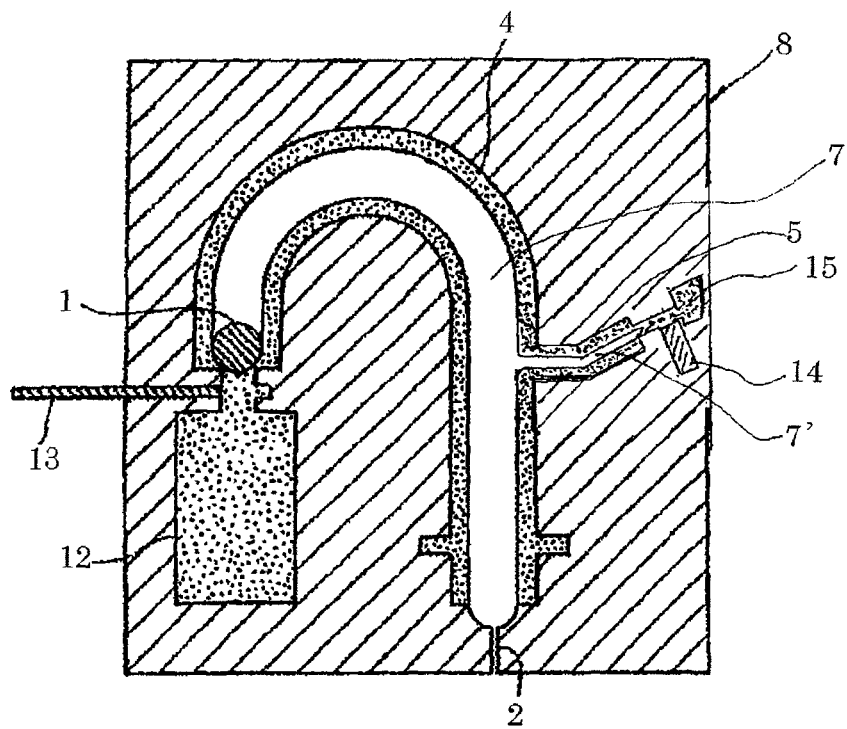
FIG. 6 An explanatory view of the manufacturing method according to the present invention.

Subsequently, as shown in FIG. 6, while the pressurized fluid is pressure-injected through the pressure port 2, the second outlet 6 is opened.

When the second outlet 6 is opened, the pressurized fluid advances toward the second outlet 6 so as to extrude a slowly cooled molten resin at the center portion of the branch cavity 5 into the second excess resin storage cavity 15 through the second outlet 6, while remaining resin close to the outer periphery portion of the branch cavity 5, which starts to be solidified by cooling. After the pressurized fluid has passed through the branch cavity 5, a branch pipe hollow 7' is formed. The diameter of the branch cavity 5 is smaller than the maximum diameter of the floating core 1, whereby the floating core 1 can be prevented from entering the inside of the branch cavity 5. When the diameter of the branch cavity 5 is required to be larger than the diameter of the floating core 1, the branch cavity 5 is installed at a suitable angle, which prevents the entering of the floating core 1, to the advancing direction of the floating core 1 in the main cavity 4, whereby the floating core 1 can be prevented from entering the inside of the branch cavity 5.

The resin of a portion at which the branch pipe hollow 7' is formed is pressed against the peripheral wall surface of the branch cavity 5 by the pressure of the pressure-injected pressurized fluid, and the shape of the branch pipe hollow 7' is maintained.

The above state is maintained while a pressurized fluid pressure is applied into the main pipe hollow 7 and the branch pipe hollow 7', so that the resin and the periphery wall surfaces of the main cavity 4 and the branch cavity 5 can be satisfactorily in press contact with each other, whereby occurrence of sink due to cooling can be prevented.

The second outlet 6 may be opened after the floating core 1 reaches the first outlet 3 or after the main pipe hollow 7 reaches a portion at which the branch cavity 5 communicates with the main cavity 4 and within an arbitrary period until immediately before the center portion in the branch cavity 5 is solidified. As described above, when the diameter of the branch cavity 5 is smaller than the maximum diameter of the floating core 1, the molten resin filled in the branch cavity 5 is solidified earlier than the molten resin filled in the main cavity 4, and thus it may become difficult to make the pressurized fluid enter the branch cavity 5 or to make the pressurized fluid advance in the branch cavity 5. In such a case, after the main cavity 4 and the branch cavity 5 are filled with a necessary amount of the molten resin, the second outlet 6 may be opened before the main pipe hollow 7 reaches the portion at which the branch cavity 5 communicates with the main cavity 4.

Namely, as long as after the main cavity 4 and the branch cavity 5 are filled with a necessary amount of the molten resin, the first outlet 3 may be opened earlier than the second outlet 6, or otherwise. Alternatively, the first outlet 3 and the second outlet 6 may be opened simultaneously. Those outlets may be opened by control of a timer, for example.

Figure 7:
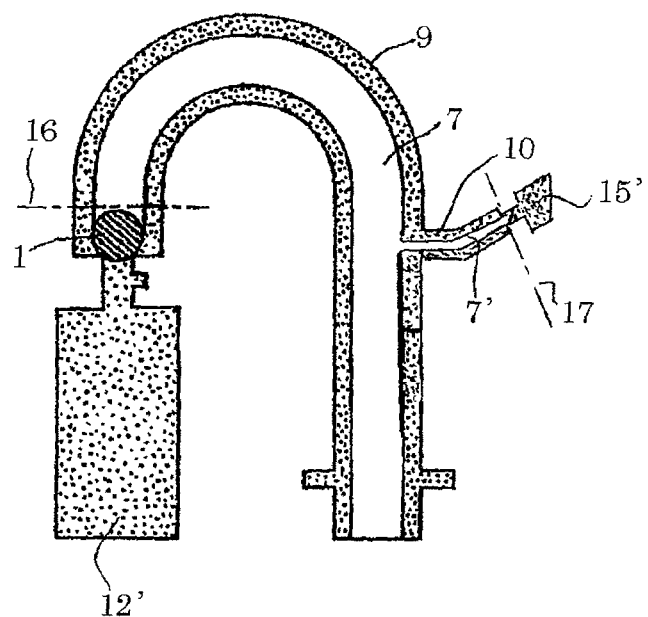
FIG. 7 A cross-sectional view of a molded product removed from the mold of FIG. 2.

After the resin in the mold 8 is cooled, the pressurized fluids in the main pipe hollow 7 and the branch pipe hollow 7' are discharged, and a molded product shown in FIG. 7 is removed from the mold 8. When a gas is used as the pressure fluid, the pressurized fluid can be discharged by opening the pressure port 2 to the atmosphere; however, it is preferable that the pressurized fluid is recovered into a recovery tank (not shown) for circulation utilization.

Although molded bodies 12' and 15' formed of the excess resin are integrated in the removed molded product, the molded bodies 12' and 15' are cut at the positions of cutting lines 16 and 17, whereby a molded body of the pipe with a branch shown in FIG. 1 can be obtained. The excess resin molded bodies 12' and 15' are recovered to be ground or repelletized according to need, whereby a waste of the resin can be eliminated.

DESCRIPTION OF THE REFERENCE NUMERALS

1 Floating core
2 Pressure port
3 First outlet
4 Main cavity
5 Branch cavity
6 Second outlet
7 Main pipe hollow
7' Branch pipe hollow
8 Mold
9 Main pipe
10 Branch pipe
11 Gate
12 First excess resin storage cavity
13 First opening and closing means
14 Second opening and closing means
15 Second excess resin storage cavity
16, 17 Cutting line

The invention claimed is:

1. A method of manufacturing a pipe with a branch, comprising:
   injecting a molten resin into a main cavity, which has on its one end a pressure port provided with a floating core and on its other end a first outlet, and a branch cavity, which communicates with the main cavity and has on its end a second outlet allowed to open and close;
   pressure-injecting a pressurized fluid through the pressure port after the injection of the molten resin, and moving the floating core to the first outlet side, and, at the same time, extruding the molten resin from the first outlet to form a main pipe hollow; and
   extruding the molten resin by the pressurized fluid from the second outlet to form a branch pipe hollow, wherein
   a portion at which the branch cavity communicates with the main cavity is located between the pressure port and the first outlet.

2. The method of manufacturing a pipe with a branch according to claim 1, wherein in the formation of the branch pipe hollow, the second outlet is opened after the main pipe hollow reaches a portion at which the branch cavity communicates with the main cavity, and the molten resin is extruded by the pressurized fluid from the second outlet to form the branch pipe hollow.

3. The method of manufacturing a pipe with a branch according to claim 1, wherein a first excessive resin storage cavity is provided so that the main cavity communicates with the first excessive resin storage cavity via the first outlet and the molten resin is extruded from the first outlet to the first excessive resin storage cavity so as to form the main pipe hollow.

4. The method of manufacturing a pipe with a branch according to claim 1, wherein a second excessive resin storage cavity is provided so that the branch cavity communicates with the second excessive resin storage cavity via the second outlet and the molten resin is extruded by the pressurized fluid from the second outlet to the second excessive resin storage cavity so as to form the branch pipe hollow.

5. The method of manufacturing a pipe with a branch according to claim 3, wherein a second excessive resin storage cavity is provided so that the branch cavity communicates with the second excessive resin storage cavity via the second outlet and the molten resin is extruded by the pressurized fluid from the second outlet to the second excessive resin storage cavity so as to form the branch pipe hollow.

6. The method of manufacturing a pipe with a branch according to claim 3, further comprising a step of removing a portion formed in the first excessive resin storage cavity so as to obtain the pipe with a branch.

7. The method of manufacturing a pipe with a branch according to claim 4, further comprising a step of removing a portion formed in the second excessive resin storage cavity so as to obtain the pipe with a branch.

8. The method of manufacturing a pipe with a branch according to claim 5, further comprising a step of removing a portion formed in the second excessive resin storage cavity so as to obtain the pipe with a branch.

\* \* \* \* \*